United States Patent [19]

Sundberg

[11] 3,873,366
[45] Mar. 25, 1975

[54] ELECTRODE FOR ELECTRICAL LEAD ACCUMULATORS

[75] Inventor: Erik G. Sundberg, Stockholm, Sweden

[73] Assignee: Aktiebolaget Tudor, Stockholm, Sweden

[22] Filed: July 11, 1973

[21] Appl. No.: 378,232

[30] Foreign Application Priority Data
July 11, 1972 Sweden................................ 9109/72

[52] U.S. Cl.................................. 136/26, 136/46
[51] Int. Cl............................................ H01m 39/00
[58] Field of Search................. 136/26, 27, 36–67, 136/10, 11

[56] References Cited
UNITED STATES PATENTS

| | | | |
|---|---|---|---|
| 712,316 | 10/1902 | Loppe et al. | 136/46 |
| 3,180,761 | 4/1965 | Horn et al. | 136/51 |
| 3,201,280 | 8/1965 | Yumoto | 136/26 |
| 3,447,969 | 6/1969 | Tudor et al. | 136/26 |
| 3,453,145 | 7/1969 | Duddy | 136/46 |
| 3,519,485 | 7/1970 | Chassoux et al. | 136/56 |
| 3,647,544 | 3/1972 | Schneider | 136/28 |

Primary Examiner—John H. Mack
Assistant Examiner—C. F. Lefevour
Attorney, Agent, or Firm—Burns, Doane, Swecker & Mathis

[57] ABSTRACT

An electrode plate for a lead-acid storage battery which is composed of three thin grid units, each having its own active material. The characteristics of the cell can be controlled by varying the electrochemical properties of the different grid units. The lead alloy material of one grid unit may be different from the lead alloy material of another unit which can allow the use of some grids that are essentially free of antimony. The porosity of the active material on different grids can also be varied. The several grid units are joined together to provide a common electrical flag terminal which can be joined in a conventional manner to a pole bridge and thus be part of a plate set.

11 Claims, 7 Drawing Figures

PATENTED MAR 25 1975 3,873,366

ELECTRODE FOR ELECTRICAL LEAD ACCUMULATORS

The present invention relates to electric storage batteries of the lead-acid type and more particularly to a novel electrode plate.

In batteries of the above type, each cell includes a plurality of interleaved positive and negative electrode plates with the positive plates connected to a positive pole bridge and the negative plates connected to a negative pole bridge. The present invention pertains only to the construction of a single plate which is one of many that are connected to a pole bridge. According to the invention, each plate is composed of several thin, flat units that are secured together. If one of the thin units has different electrochemical qualities from the others, the electrochemical properties of the electrode, and therefore of the accumulator cell, can be better controlled, so that a superior cell is obtained.

Electrodes for lead accumulators are usually produced with a grid of antimony-alloyed lead. The antimony content is usually in the range of 6 to 10%. The addition of antimony provides added mechanical strength thereby making it possible to handle the grid more easily during the production of electrodes and cells. While antimony also gives certain beneficial electrochemical qualities, its major disadvantage is that it contributes to an increased self-discharge. In the past, considerable effort has been expended to obtain suitable antimony-free lead alloys. An example of such an alloy is lead with small additions of silver, tellurium and arsenic. Another example is lead combined with calcium. These alloys have disadvantages, however, among which are the increased difficulties connected with the casting of the grid.

In the prior lead-acid accumulators, the active material is placed either in or around the grid. This active material consists mainly of lead or lead dioxide. The active material is then changed to sulfate of lead during operation of the battery. The desired degree of porosity of the active material varies with respect to the demands placed on the accumulator. To achieve maximum durability, the prior art lead accumulators have contained an active material with relatively low porosity, which has resulted in the material holding together well and the danger of sludging has been reduced. To achieve maximum utilization of the active material from an electrical standpoint and a cell which has the capacity of withstanding high currents, it has been desirable to utilize active material which has a high porosity. However, such an electrode contains proportionately large amounts of free sulfuric acid. Additionally, large amounts of sulfuric acid cannot be conducted to the electrode through diffusion when operated with certain discharge times and currents that are needed for certain applications.

It is an object of the present invention to eliminate for the most part some or all of the abovementioned problems. The unitary electrode plate of the present invention may be produced by placing together several rather thin, flat units with different electrochemical properties, which properties are controlled by varying either or both the material of the grid and the active material. An electrode according to the present invention can consist of any number of thin units, but it is contemplated to utilize two or three thin units. For example, where three units are used, the outer unit of the electrode which faces another electrode would normally be of the same construction, and the inner unit would have a different construction. However, where one side of an electrode faces the cell wall, the electrode may be made of two units of different kinds. The different units may have different thickness, but the combined thicknesses should not appreciably exceed any more than necessary the conventional plate thickness in order to obtain good utilization of the volume required by the battery casing.

The various units in an electrode according to the present invention can be held together in many different ways. One way is by having the grids of the different units soldered or welded together in a suitable manner. In certain cases, it is sufficient to unite the different units with the flag or banner part; in other cases, a point connection over the whole grid area, or a joining of the marginal edge frames all around the outer edges, may be desirable. Joining the outer edges of the grid may not be important if the electrochemical properties desired result from use of different grid materials. However, in the case where it is intended to use certain mechanical properties as well, joining of the grid all around the outside edges may be essential.

If active material having different characteristics, i.e., different porosity in the different units, is desired, then other methods for joining the parts together, in addition to those mentioned above, may be desirable. Welding, of course, can always be used, but this is a labor intensive operation depending on which types of units are to be joined together for an electrode. In many cases it may be necessary to clean each welding spot carefully to make it free from oxides and other impurities before the units can be joined together. A simple method is to postpone the fusion of the separate units until a late stage in the production process. The electrodes can then be held together by inserting the units in a frame of a clamping type. It is also possible to use outside layers on opposite sides of the electrode which together with the frame form a pocket. The layers of the pocket must consist chiefly of porous material, but it is contemplated that these layers may also serve as a separator in the finished cell.

An electrically conductive union of the separate units can then be effected by joining together several electrodes with a pole bridge to form a so-called plate package. In this manner, the undesirable problem of unnecessary labor can be eliminated. Such a frame or pocket can, of course, be utilized in connection with electrodes which have been joined together in any other manner.

Another manner of joining the units together in certain other cases is by riveting. The rivets may be made of electrically conductive or non-conductive material, and examples of suitable materials are different lead alloys and thermoplastic material, such as polethylene, polypropylene, polyesters or the like. If riveting is used for joining the parts, then it is desirable to provide the grid with special holes for the rivets. Rivets of electrically non-conductive material may also be used in order to attach inactive material to the electrode, such as distancing strips or ribs, or separators of various kinds.

Since lead alloys of different kinds, for example an antimony alloy and an antimony-free alloy, can be employed for the different grid units in a unitary plate, it is desirable to prevent the antimony from passing from one electrode to the other via the electrolyte. This transfer of antimony can be avoided to a large extent if the grids are produced in such a way that the grid holding the antimony is completely surrounded by grids of an antimony-free alloy. If the electrode plate is made by placing together three units, this result can be obtained when the outer units are made with antimony-free grids in such a way that they form a boxlike construction, inside which there is a third grid with the necessary amount of antimony.

As can be seen from the foregoing discussion concerning the advantages and disadvantages resulting from varying porosity of the active material, it will be appreciated that the porosity can be varied as desired with the different units, independently of their make-up.

These and other objects of the invention will become more fully apparent from the claims, and from the description as it proceeds in connection with the drawings wherein:

Figure 1:
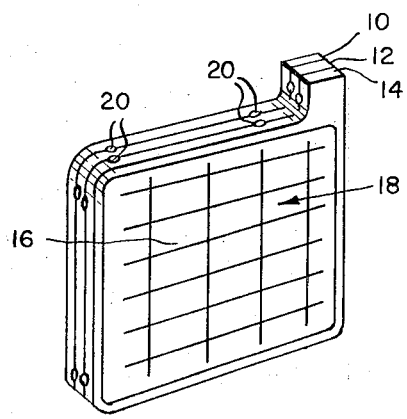
FIG. 1 is a pictorial view showing diagrammatically the construction of an electrode in accordance with the present invention which is formed of three thin, flat units with each unit having its own support grid of lead or lead alloy material and its own active material secured over the surface area of the grid with the edge frames of each grid secured together at spaced points.

Referring now to the drawings, the electrode shown in FIG. 1, which is here assumed to be a negative electrode, is composed of three units 10, 12 and 14. Each grid unit may be constructed in a conventional manner with an edge frame, an interior criss-cross network 16, and the so-called electrical terminal flag shown at the upper right-hand corner of FIG. 1 of lead or lead-alloy material. The active material may be pasted onto grid 16 in accordance with conventional practice. Each of the grid units 10, 12 and 14 is preferably made somewhat thinner than has been customary so that the overall thickness of the unitary electrode is as near the size of a conventional electrode as possible. The grid units 10, 12, and 14 may be connected together at spaced points 20 which in FIG. 1 are illustrated as dots representing spots welds or soldering of the edge frame material of each grid unit 10, 12, and 14.

Figure 2:
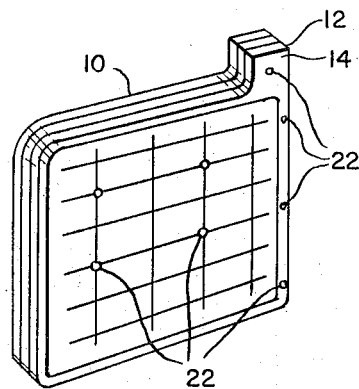
FIG. 2 shows a similar view of a second embodiment where the units forming the electrode are secured together by rivets which are located at spaced positions through the active material and optionally along the marginal edge frame of the grid units.

In FIG. 2, the same construction is shown where the grid units are connected together by rivets 22 that are dispersed either through the center of the grid matrix or around the edge frames of the grid units, or both.

Figure 3:
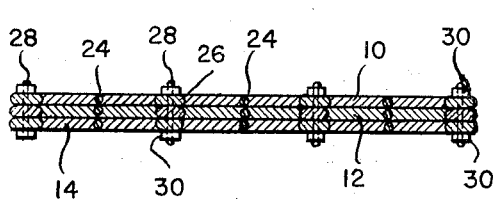
FIG. 3 is a view of a multi-unit electrode in section showing the use of rivets which also contain a distancing or spacing element for securing the units together and forming a unitary electrode.

In FIG. 3, the three grid units 10, 12 and 14 are shown in cross section. Narrow lead strips 24 are provided in the grid network and have widened or flattened regions 26 which are provided with a hole for a rivet 28. The rivets also secure a distance element or spacer 30.

Figure 4:
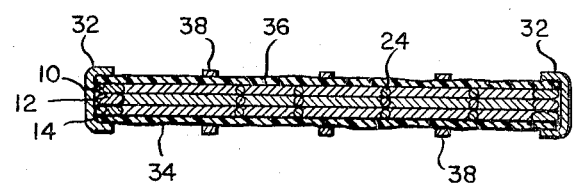
FIG. 4 is a similar cross-sectional view showing the grid units held together by a clamp which also holds across the surfaces of the electrode which face adjacent electrodes a layer of porous insulating material to thus form a pocket for the electrode.

Referring now to FIG. 4, the three grid units 10, 12, and 14 are again shown in cross section. The marginal edge frame of the grid unit here illustrated as being secured together by a clamp 32 having a C-shaped cross section as illustrated. On the outer surfaces of the grid units which face adjacent electrodes in the battery, there are provided layers 34 and 36 of a porous material such as glass fiber mats or sheets, synthetic fiber material of a non-woven type, such for example as a polyester, polypropylene or similar material as is customarily used for separators. On the outside of the layers 34 and 36 a suitable number of distance ribs or spacer strips 38 may be provided to properly position the electrode in the battery between two plates of opposite polarity.

Figure 5:
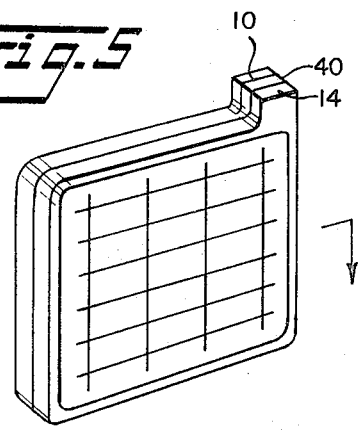
FIG. 5 is a pictorial view of a further embodiment wherein the outer two grid units contain marginal edge frames which extend over and together surround the inner grid unit.
Figure 6:
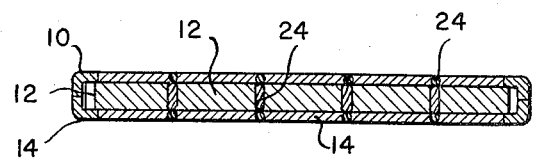
FIG. 6 is a view in cross section taken along line 6-6 of FIG. 5.

FIGS. 5 and 6 are views of an alternative embodiment wherein the outer electrodes 10 and 14 have an edge frame portion which extends over and encloses the inner grid unit 12, which preferably has an electrical current carrying portion 40 which extends up into the region of the flag at the upper right-hand corner. The outer units 10 and 14 may be suitably joined along the line of intersection, either in a point-to-point spacing or along the entire connecting line, with only one seal rather than two as would be required in the embodiments illustrated in FIGS. 1 through 4.

In the situation where a grid unit is on the end of the electrode facing a casing wall, it is desirable only to have one outer electrode 14 and one inner electrode 12, both of which may have the reinforcing members 24, as discussed above.

Figure 7:
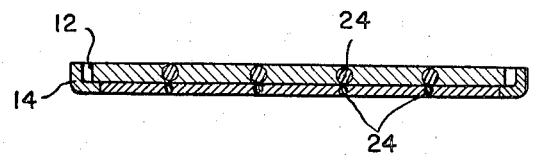
FIG. 7 is a similar cross-sectional view of an electrode having only two grid units which is adapted to have one grid unit placed adjacent the cell wall of the battery casing.

As illustrated in FIGS. 6 and 7, the outer electrodes preferably have a smaller thickness than the inner electrode 12. Also, the porosity of the active material in the outer electrodes 10 and 14 is preferably greater than the porosity of the active material in the inner electrode 12.

It is also advantageous to make one or more of the outer grid units of a lead alloy which is substantially free of antimony to thereby reduce the likelihood of self-discharge.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. In a lead-acid storage battery comprising a plurality of electrode plates of like polarity connected in parallel in which said electrode plates comprise individual, flat, grid-like support structures having electrochemically active material secured over the surface of said grid-like structures, the improvement which comprises:

unitary, composite electrode plates, each of said plates being comprised of two or more thin, flat grid units, each of said grid units having its own support grid of a lead or a lead alloy material and its own active material secured over the surface area of said grid, the active material on one of said units being selected to cause said unit to have similar polarity but different electrochemical properties from an adjacent unit; and means for securing said units together in a face-to-face relationship to produce a unitary electrode plate having a common electrical flag terminal portion.

2. The electrode plate of claim 1 wherein the grid material of one of said grid units is different from the grid material of another unit in said composite plate.

3. The electrode plate of claim 1 wherein the porosity of the active material on one of said grid units in said unitary composite electrode plate is different from the porosity of the active material on an adjacent grid unit.

4. The electrode plate of claim 2 wherein the material of one grid unit consists of a lead alloy that is essentially free of antimony.

5. The electrode plate of claim 1 wherein the unitary, composite electrode plate is constructed of at least three thin, flat units and formed in such a way that the two outer units cover the active material on the grid surface area of the unit lying therebetween.

6. The composite plate of claim 5 wherein the two outer units which face another electrode have active material with a lower porosity than the other grids in said composite plate have.

7. The composite electrode plate of claim 6 wherein the outer thin grid units have a smaller thickness than the inner thin grid units.

8. The composite electrode plate of claim 7 wherein the grid material of one unit is different from the grid material of the other units of said composite electrode.

9. The composite electrode plate of claim 5 wherein the grid material of one unit is different from the grid material of the other units of said composite electrode.

10. The electrode plate of claim 5 wherein at least one outer grid unit of said composite electrode plate has edges which extend over the marginal edges of an adjacent inside unit.

11. The composite electrode plate of claim 5 wherein the outer surfaces of the grid units of said electrode which face adjacent electrodes have located thereover a layer of electrolyte resistance insulating material, said layer being sufficiently porous to allow the electrolyte circulation therethrough during operation of said battery.

* * * * *